United States Patent [19]
Wier

[11] Patent Number: 5,897,140
[45] Date of Patent: Apr. 27, 1999

[54] BELT PRETENSIONER FOR A VEHICULAR OCCUPANT RESTRAINT SYSTEM

[75] Inventor: Franz Wier, Göggingen, Germany

[73] Assignee: TRW Occupant Restraint Systems GmbH, Alfdorf, Germany

[21] Appl. No.: 08/858,609

[22] Filed: May 19, 1997

[30] Foreign Application Priority Data

May 20, 1996 [DE] Germany ................ 296 09 054 U

[51] Int. Cl.⁶ .................................................. B60R 22/46
[52] U.S. Cl. .......................................................... 280/806
[58] Field of Search ............................................. 280/806

[56] References Cited

U.S. PATENT DOCUMENTS

| | | | |
|---|---|---|---|
| 4,458,921 | 7/1984 | Chiba et al. | 280/806 |
| 5,037,134 | 8/1991 | Tabata | 280/806 |
| 5,207,618 | 5/1993 | Nishizawa | 280/806 |
| 5,468,019 | 11/1995 | Bläse et al. | 280/806 |
| 5,519,997 | 5/1996 | Specht | 280/806 |
| 5,568,940 | 10/1996 | Lane, Jr. | 280/806 |

FOREIGN PATENT DOCUMENTS

| | | |
|---|---|---|
| 0588264 | 3/1994 | European Pat. Off. . |
| 0625450 | 11/1994 | European Pat. Off. . |
| 2636899 | 3/1990 | France . |
| 49-116726 | 6/1974 | Japan . |
| 49-125428 | 10/1974 | Japan . |
| 58-25156 | 6/1982 | Japan . |
| 248464 | 4/1990 | Japan . |

*Primary Examiner*—Kenneth R. Rice
*Attorney, Agent, or Firm*—Tarolli, Sundheim, Covell, Tummino & Szabo

[57] ABSTRACT

A belt pretensioner for a vehicular occupant restraint system comprises a piston/cylinder unit having a piston and a cylinder, a belt deflection member, a connecting part arranged between the piston and the belt deflection member and a ring-shaped seal. The cylinder has a cylinder wall with an end face and an opening in the end face through which the connecting part extends. The piston, the connecting part and the belt deflection member are displaced in a longitudinal direction upon actuation of the belt pretensioner to a tensioning path. The ring-shaped seal is arranged between the opening and the connecting part and uniformly engages the connecting part about its periphery so that any longitudinal displacement of the connecting part is counteracted by a force of more than 100 N as a result of which leakage gas flows are almost completely avoided.

17 Claims, 3 Drawing Sheets

BELT PRETENSIONER FOR A VEHICULAR OCCUPANT RESTRAINT SYSTEM

TECHNICAL FIELD

The invention relates to a belt pretensioner for a vehicular occupant restraint system.

BACKGROUND OF THE INVENTION

In belt pretensioners known hitherto comprising a piston/cylinder unit, provided with a pyrotechnical piston drive, the connecting part extends through an opening in the cylinder wall adapted as precisely as possible to the outer diameter of the connecting part, it being necessary thereby to prevent an excessively large gap between the opening and the connecting part via which the generated gas may escape. In this arrangement, the connecting part is either a piston rod or a traction cable having a smooth outer surface as possible. A ring seal may also be provided in the end face opening, said ring seal being intended to prevent escape of the gas. The seals normally used hitherto are designed so that the friction force between the seal and the connecting part is as low as possible and that the connecting part together with the belt deflection member may be easily shifted. Particularly due to the high cylinder internal pressure, when the gas generator is activated and when employing a traction cable as the connecting part, leakage results despite using a seal thus reducing the cylinder internal pressure and the tensioning force provided by the belt pretensioner.

BRIEF SUMMARY OF THE INVENTION

The invention creates a belt pretensioner, the connecting part of which is significantly better sealed with respect to the face end opening than in the case of belt pretensioners hitherto. The belt pretensioner according to the invention comprises a piston/cylinder unit having a piston and a cylinder, a belt deflection member, a connecting part arranged between the piston and the belt deflection member and a ring-shaped seal. The cylinder has a cylinder wall with an end face and an opening in the end face through which the connecting part extends. The piston, the connecting part and the belt deflection member are displaced in a longitudinal direction upon actuation of the belt pretensioner to a tensioning path. The ring-shaped seal is arranged between the opening and the connecting part and uniformly engages the connecting part about its periphery so that any longitudinal displacement of the connecting part is counteracted by a force of more than 100 N. Whilst in the case of belt pretensioners hitherto it has always been attempted to implement the contact between the seal and the connecting part with as little friction as possible, it is provided for by the invention that a connection exists between these parts which is relatively difficult to separate. The force to be overcome on activation which is higher as compared to known belt pretensioners is more than compensated by the higher cylinder internal pressure due to the reduction in the leakage flow so that the belt pretensioner according to the invention generates all-in-all a higher tensioning force than those known hitherto.

Preferably, the force opposing the longitudinal displacement is not only more than 100 N, but even more than about 600 N.

Furthermore, the seal is configured to advantage so that it more or less prevents any unwanted rotation of the connecting part in the opening as long as e.g. unintentional rotation occurs at a belt buckle which is coupled to the connecting part. It is intendeded that the seal counteracts any forced rotation of the connecting part by producing a relatively high counterforce.

Various possibilities are feasible in generating the force exerted by the seal on the connecting part and to boost this force. In accordance with one embodiment, it is provided for that the seal is elastic and is mounted in the cylinder with an interference-fit. As a result of this, the seal is pressed together so that its opening, through which the connecting part extends, attempts to constrict, resulting in the clamping force being generated or increased.

In another embodiment it is provided for that a clamping element engages the outer surface of the seal so as to press the seal together and to generate or boost the radial clamping force. The clamping element engages preferably a section of the seal protruding from the cylinder at the end face.

In accordance with a further embodiment a propelling charge within the cylinder, comprising a sleeve filled with pyrotechnical material, extends radially between the inner shell surface of the cylinder and the seal. This provides for a compact configuration of the cylinder in the region of the propelling charge. The sleeve however may also be made use of to boost the clamping force by preferably its inner wall being tapered in the direction of the outlet end of the gas to be generated, as a result of which the seal is increasingly pressed together towards the outlet end. It may further be provided for that the inner wall of the sleeve is pliantly configured radially to generate an increased clamping force on ignition of the pyrotechnical material. The gas generated on activation of the belt pretensioner results in an increased clamping force via the resilient sleeve and in a better seal.

The seal may comprise a dual function by it, in accordance with a further aspect of the invention, being configured as a damper for a stopper secured to the connecting part, this stopper coming up against the seal at the end of the tensioning path, thus enabling damping elements hitherto usual such as plastically deformable additional thick wall sections on the outer surface of the cylinder or on the stopper to be eliminated.

If the connecting part is configured as a traction cable, then the surface of the outer shell is non-cylindrical and thus difficult to seal. In accordance with the invention it is provided for that on the traction cable at least in the region of the seal a coating is applied or the cable is saturated with a coating material. By such an arrangement outer contours are achievable to any degree of smoothness and uniformity by means of which a sealing gap, otherwise existing, can be diminished. When the curable sealing material penetrates into the inner of the traction cable, leakage within the traction cable can be reduced.

One means of simply producing the seal of a plastics material consists of injection molding the seal onto the connecting part, thus creating a connection between the seal and connecting part which is not parted until a force of more than 100 N, preferably more than about 600 N is applied. Since in this aspect of the invention the seal is optimally adapted in shape to the outer contour of the connecting part, leakage hardly occurs at all.

Furthermore, the connecting part may also be molded in the seal when the latter is configured as a plastics material seal.

DETAILED DESCRIPTION OF PREFERRED EMBODIMENTS

Figure 1:
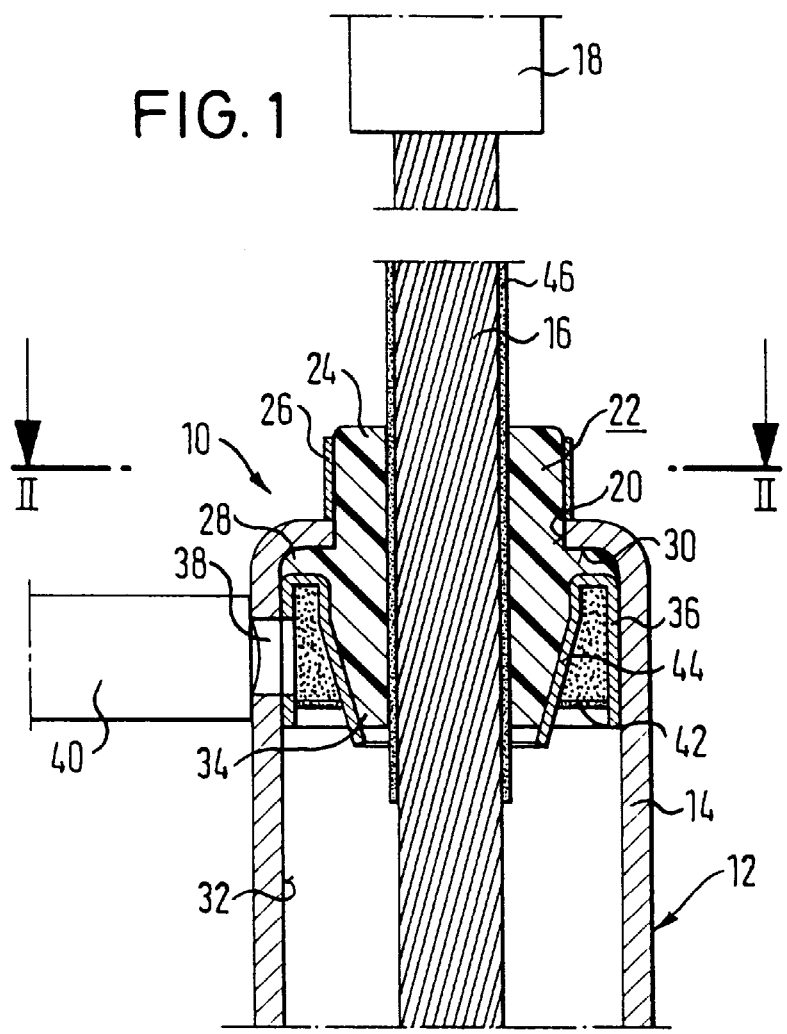
FIG. 1 is a longitudinal section through a belt pretensioner in accordance with the invention according to a first embodiment in the region of the end face through which the connecting part extends.

In FIG. 1 a belt pretensioner 10 for a vehicular occupant restraint system is shown which comprises a piston/cylinder unit 12 including a cylinder 14 and a piston (not shown). A connecting part in the form of a flexible traction cable 16, arrested at the piston, is further secured to a belt deflection member in the form of a belt buckle 18. The traction cable 16 thereby extends through an opening 20 at one end face of the cylinder 14. In the region of the opening 20 a seal 22 is provided which protrudes from the cylinder 14 by a section 24. At its outer surface in the region of the section 24 a clamping element 26 in the form of a crimp ring engages which is depicted more detailed in FIG. 2. In addition to this it is also possible to configure the clamping element 26 as a tube clamp. The function of the clamping element 26 consists of pressing together the section 24 protruding from the cylinder 14 so that the seal 22 exerts a radial clamping force on the traction cable 16.

The diameter of the opening 20 and the outer diameter of the seal 22 in the region of the opening are adapted to each other so that a press fit materializes as a result of which a clamping force of the seal 22 is exerted uniformly about the outer circumference of the traction cable 16 with respect to the latter also in the region of the opening 20. In the interior of the cylinder 14 a radially projecting ring flange 28 is formed at the seal 22 resting against the inner end face 30 of the cylinder 14, which extends radially up to the inner shell surface 32 of the cylinder 14 and thus creates a good seal between the seal 22 itself and the opening 20. The ring flange 28 is adjoined by a cylindrical section 34 of the seal 22.

In the interior of the cylinder 14 a propelling charge having a circular sleeve 36 is provided which is filled with a pyrotechnical material. Via a common opening 38 in the sleeve 36 and in the cylinder shell the pyrotechnical material in the interior of the sleeve 36 can be ignited via an igniter 40. At its lower end face the sleeve 36 has several gas outlet orifices or is configured completely open, the gas outlet orifices or the end face in its entirety are closed off from the ingress of moisture by a lacquer seal 42 or film seal also provided in the region of the opening 38. The lower end face of the sleeve 36 is not arranged in the region of the lower edges of its outer wall and its inner wall 44, it instead being located somewhat in the interior of the sleeve protected. The end face thus directly adjoins the pyrotechnical material and the latter does not fill the sleeve 36 up to the region of the lower edges so as to prevent an accidental ignition in the case of non-professional transportation. The inner wall 44 is tapered in the direction of its lower end and thus forces the seal 22 radially inwards in the region of the section 34 so that the seal 22 also exterts in this section a radial clamping force on the traction cable 16.

Figure 2:
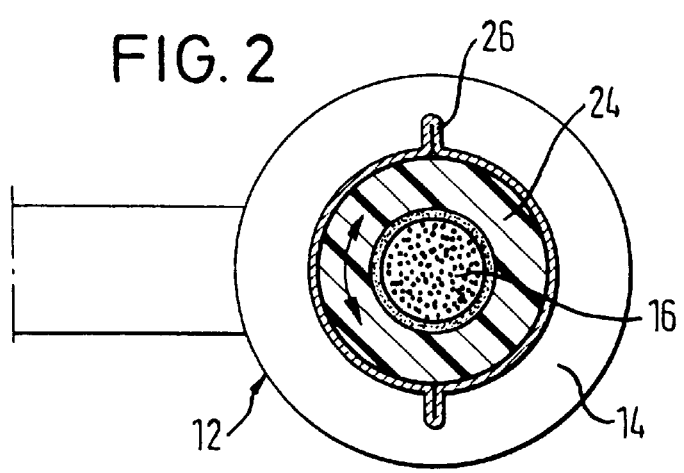
FIG. 2 is cross-section along the line II—II in Fig.1.

The complete clamping force exterted by the seal 22 on the traction cable 16, as measured in the longitudinal displacement of the traction cable 16, amounts to at least 100 N, preferably about at least 600 N. The connection of the seal 22 to the traction cable 16 as a result of the clamping force also has the effect that the traction cable 16 is rotatable only when subjected to a considerable force, as is indicated in FIG. 2 by the two-ended arrow. Accordingly, any unwanted turning of the traction cable 16 and of the belt buckle 18 is at least made more difficult.

Since the traction cable 16 exhibits an outer shell surface which fails to represent a precise cylindrical surface, it is provided at least in the region of the seal 22 with a coating 46 of a plastics material which gives it a precisely cylindrical outer contour. In this arrangement the traction cable 16 may be saturated e.g. in a curable sealing means such as silicone, this having the advantage that between the fibers of the traction cable 16 at least in the radial outer region of the traction cable 16 no leakage can occur following activation of the belt pretensioner 10. The coating 46 may, of course, also be configured as shrinkage tubing as usual hitherto.

In the embodiment described thus far the force opposing any longitudinal displacement of the traction cable 16 is exerted by the radial clamping force which gives rise to a stiction force between the traction cable 16 and the seal 22.

In addition to this it is, however, also possible to configure the seal 22 as a plastics seal which is directly injection molded on the coated or uncoated traction cable 16. Furthermore, the traction cable 16 may also be molded in the seal 22, this also being possible in a plastics injection molding machine.

If the coating 46 is not desired the fluid or pasty plastics material for the seal 22 is able to penetrate under pressure into the depressions on the outer surface of the traction cable 16 and into the interstices between the fibers of the traction cable 16, this promoting the sealing effect. In this way the force opposing the longitudinal displacement of the traction cable 16 is produced not only by a clamping force but also by adhesive forces and partial positive contact, depending on the material of the seal 22.

Due to the high clamping forces and, where provided for, due to molding the seal 22 to the traction cable 16 or molding the traction cable 16 in the seal 22 no sealing gap whatsoever materializes between the traction cable 16 and the seal 22 even when high pressures exist in the interior of the cylinder 14.

Figure 3:
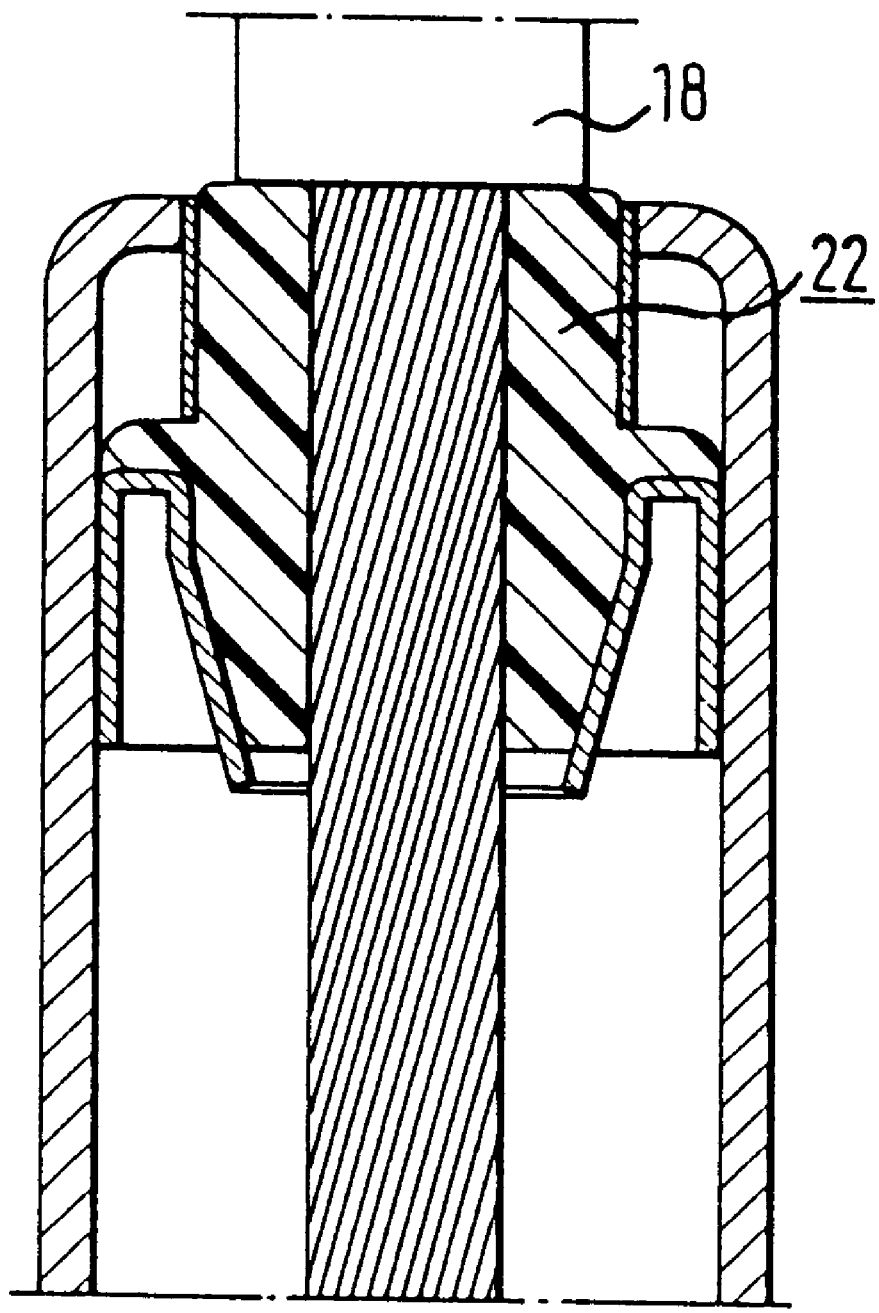
FIG. 3 is a longitudinal section of the belt pretensioner shown in FIG. 1 at the end of the tensioning action.
Figure 4:
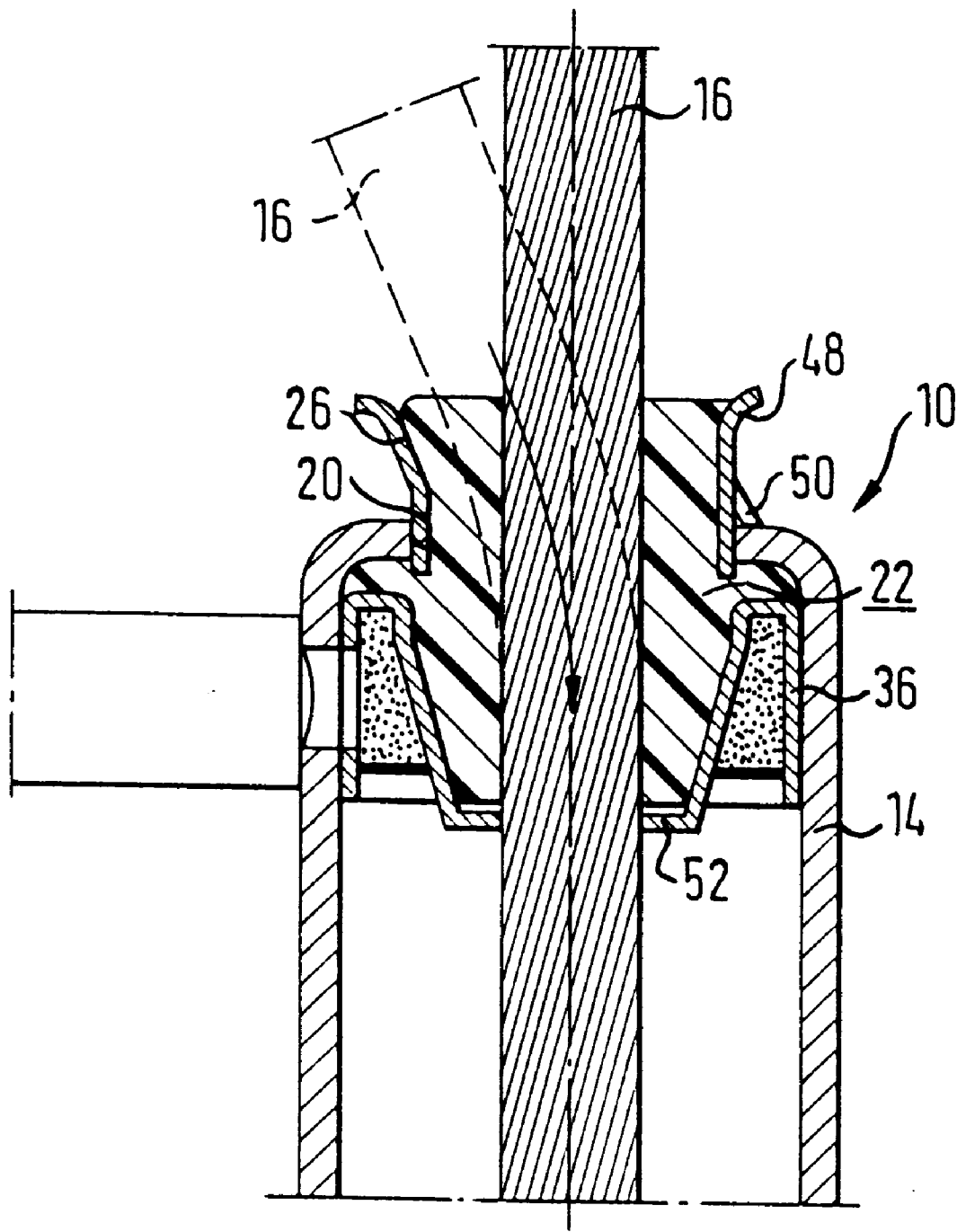
FIG. 4 is a longitudinal section through a belt pretensioner in accordance with a second embodiment.

The second embodiment of the belt pretensioner 10 shown in FIG. 4 differs from the first embodiment shown in FIGS. 1 to 3 by the clamping element 26 having an end flared in the direction of the belt buckle 18 and protruding through the opening 20, in which it is additionally supported, into the interior of the cylinder 14. The flared end of the clamping element 26 may be configured funnel-shaped as depicted in the left-hand half of FIG. 4, so that the clamping element 26 is conically tapered towards the opening 20, or it may feature a rounded end 48 as depicted in the right-hand half of the clamping element 26. The embodiment as shown in FIG. 4 enables the traction cable 16 to be oriented inclined in the cylinder 14 as is indicated by the dashed lines. In the absence of this flared end there would be a risk due to this inclined orientation of the traction cable 16 in the cylinder 14 that the seal 22 is pressed together so strongly that the traction cable 16 rubs against the clamping element 26 and the one resulting in the damage of the other.

Several ribs 50 provided on the outer circumference of the clamping element 26 serve to support it on the cylinder 14 and prevent the clamping element 26 from deforming or shifting when the traction cable 16 enters the cylinder 14 non-linearly.

In the hold-back case the inclined entry of the traction cable 16 in the cylinder 14 causes the traction cable 16 to attempt to tear the seal 22 along with it. A closed lower end 52 of the sleeve 36 precludes the seal 22 being torn from its mount in the sleeve 36, the end 52 being configured such that it clasps the traction cable 16 by a gap which is as small as possible.

The action of the belt pretensioner will now be explained in more detail with reference to FIGS. 1 to 3. In case of a collision the pyrotechnical material in the interior of the sleeve 36 is ignited by the igniter 40 and gas generated. The gas enters the cylinder space 14, the inner wall 44 projecting downwards past the seal 22 preventing the flame from being directly directed at the traction cable 16 on burn-out of the pyrotechnical material. The inner wall 44 is pliantly configured radially so that it is forced radially inwardly by the high gas pressure generated and thus exerts in the region of the section 34 an increased radial clamping force on the traction cable 16 which is particularly of advantage because it is in this region that the risk is greatest of a gap forming between the traction cable 16 and the seal 22 due to the high gas pressure.

Due to the force exerted on the piston, which is readily able to overcome the force of the seal counteracting a displacement of the traction cable 16, the belt buckle 18 is drawn downwards via the traction cable 16 until a stopper in the form of the bottom end face of the belt buckle 18 or the end face of a cable fastening adjoining the belt buckle housing comes up against the elastically configured seal 22 which thus acts as a damper. Due to the impact the seal 22, as shown in FIG. 3, is able to shift together with the clamping element 26 into the interior of the cylinder 14, as a result of which the maximum tensioning path is increased.

Due to the stiction and, when the seal 22 is directly molded to the traction cable 16, the even positive connection in part, a good sealing effect materializes so that leakage can be prevented to a major degree and the retensioning force boosted.

I claim:

1. A belt pretensioner for a vehicular occupant restraint system, comprising a piston/cylinder unit having a piston and a cylinder, a belt deflection member, a connecting part arranged between said piston and said belt deflection member and a ring-shaped seal, said cylinder having a cylinder wall with an end face and an opening in said end face through which said connecting part extends, said piston, said connecting part and said belt deflection member being displaced in a longitudinal direction upon actuation of said belt pretensioner to a tensioning path, said ring-shaped seal being arranged between said opening and said connecting part and uniformly engaging said connecting part about its periphery so that any longitudinal displacement of the connecting part is counteracted by a force of more than 100 N.

2. The belt pretensioner as set forth in claim 1, wherein said seal counteracts said longitudinal displacement by a force of more than about 600 N.

3. The belt pretensioner as set forth in claim 1, wherein said seal prevents any undesired turning of said connecting part in said opening to a major extent.

4. The belt pretensioner as set forth in claim 1, wherein said seal exerts a radial clamping force on said connecting part and wherein said seal is elastic and is mounted in said cylinder with an interference-fit to generate or to boost said radial clamping force.

5. The belt pretensioner as set forth in claim 1, wherein said seal exerts a radial clamping force on said connecting part, wherein said seal has an outer surface and wherein a clamping element is provided which engages said seal for pressing said seal together and for one of generating and boosting said radial clamping force.

6. The belt pretensioner as set forth in claim 5, wherein said seal protrudes from said end face of said cylinder and engages said clamping element at least partly outside of said cylinder.

7. The belt pretensioner as set forth in claim 6, wherein said clamping element comprises an end flared towards said belt deflection member.

8. The belt pretensioner as set forth in claim 1, wherein said cylinder has an inner shell surface and wherein a propelling charge including a cylindrically ring-shaped sleeve filled with pyrotechnical material is provided within the interior of said cylinder and radially extends between said inner shell surface and said seal, said propelling charge generating gas upon actuation of said belt pretensioner.

9. The belt pretensioner as set forth in claim 8, wherein said seal exerts a radial clamping force on said connecting part and wherein said sleeve has an inner wall and an outlet end for said generated gas, said inner wall being tapered in the direction of said outlet end for pressing said seal together and for one of generating and boosting said radial clamping force on said connecting part.

10. The belt pretensioner as set forth in claim 8, wherein said sleeve has an inner wall which is pliantly configured in the radial direction to generate an increased clamping force on ignition of said pyrotechnical material.

11. The belt pretensioner as set forth in claim 8, wherein said sleeve has gas outlet orifices, said orifices and the shape of said sleeve are adapted to each other so that said generated gas is not directly directed at said connecting part in the region of said gas outlet orifices.

12. The belt pretensioner as set forth in claim 1, wherein a stopper secured to said connecting part is provided which impinges said seal at the end of said tensioning path, said seal being configured as a damper for said stopper.

13. The belt pretensioner as set forth in claim 12, wherein said seal is axially displaced by said impinging stopper.

14. The belt pretensioner as set forth in claim 1, wherein said connecting part is a traction cable having a coating applied on its outer surface at least in the region of said seal.

15. The belt pretensioner as set forth in claim 1, wherein said connecting part is a traction cable having a coating which is produced by saturating said cable with a curable coating material.

16. The belt pretensioner as set forth in claim 1, wherein said seal is configured as a plastics seal injection molded on said connecting part.

17. The belt pretensioner as set forth in claim 1, wherein said seal is a plastics seal and said connecting part is molded in said seal.

* * * * *